United States Patent [19]

Singer et al.

[11] Patent Number: 4,734,926

[45] Date of Patent: Mar. 29, 1988

[54] X-RAY FILM CASSETTE FOR DAYLIGHT SYSTEM

[75] Inventors: Rudolf Singer, Hassenroth; Hans P. Weihe, Frankfurt, both of Fed. Rep. of Germany

[73] Assignee: E. I. Du Pont de Nemours and Company, Wilmington, Del.

[21] Appl. No.: 864,856

[22] Filed: May 20, 1986

[30] Foreign Application Priority Data

Jun. 5, 1985 [DE] Fed. Rep. of Germany ....... 3520196

[51] Int. Cl.$^4$ .............................................. G03B 42/04
[52] U.S. Cl. .................................... 378/187; 378/185; 378/182
[58] Field of Search ................ 378/187, 185, 182, 172

[56] References Cited

U.S. PATENT DOCUMENTS

| 3,511,990 | 5/1970 | Hauss . | |
|---|---|---|---|
| 3,715,087 | 2/1973 | Schmidt | 242/67 |
| 3,784,835 | 1/1974 | Schmidt . | |
| 3,790,160 | 2/1974 | Schmidt . | |
| 3,870,889 | 3/1975 | Schmidt . | |
| 3,930,165 | 12/1975 | Robinson et al. | 378/187 |
| 3,934,735 | 1/1976 | Schmidt . | |
| 4,018,033 | 4/1977 | Schmidt . | |
| 4,350,248 | 9/1982 | Bauer | 206/455 |
| 4,383,330 | 5/1983 | DeFelice et al. | 378/187 |
| 4,444,484 | 4/1984 | Best et al. | 354/276 |
| 4,498,005 | 2/1985 | Oono et al. | 250/327 |
| 4,538,294 | 8/1985 | Tamura et al. | 378/187 |
| 4,613,984 | 9/1986 | Fisher et al. | 378/187 |

FOREIGN PATENT DOCUMENTS 0108982 5/1984 European Pat. Off. .
1454750 11/1976 United Kingdom .

Primary Examiner—Carolyn E. Fields
Assistant Examiner—Joseph A. Hynds

[57] ABSTRACT

The disclosure involves an X-ray daylight cassette with shortened unloading times. The cassette, which has a film insertion slot on one side, contains two intensifying screens, one of which is affixed to the pressure plate so that the screen has edge zones that are not bonded to the pressure plate on the two long dimensions and optionally, on the short dimension opposite the film insertion slot.

5 Claims, 9 Drawing Figures

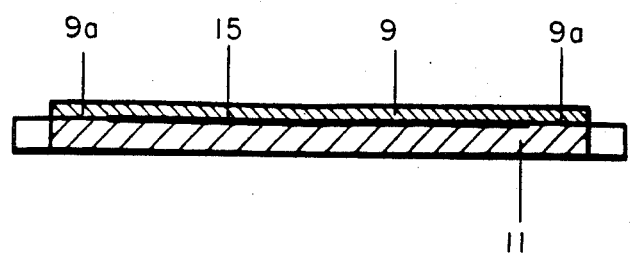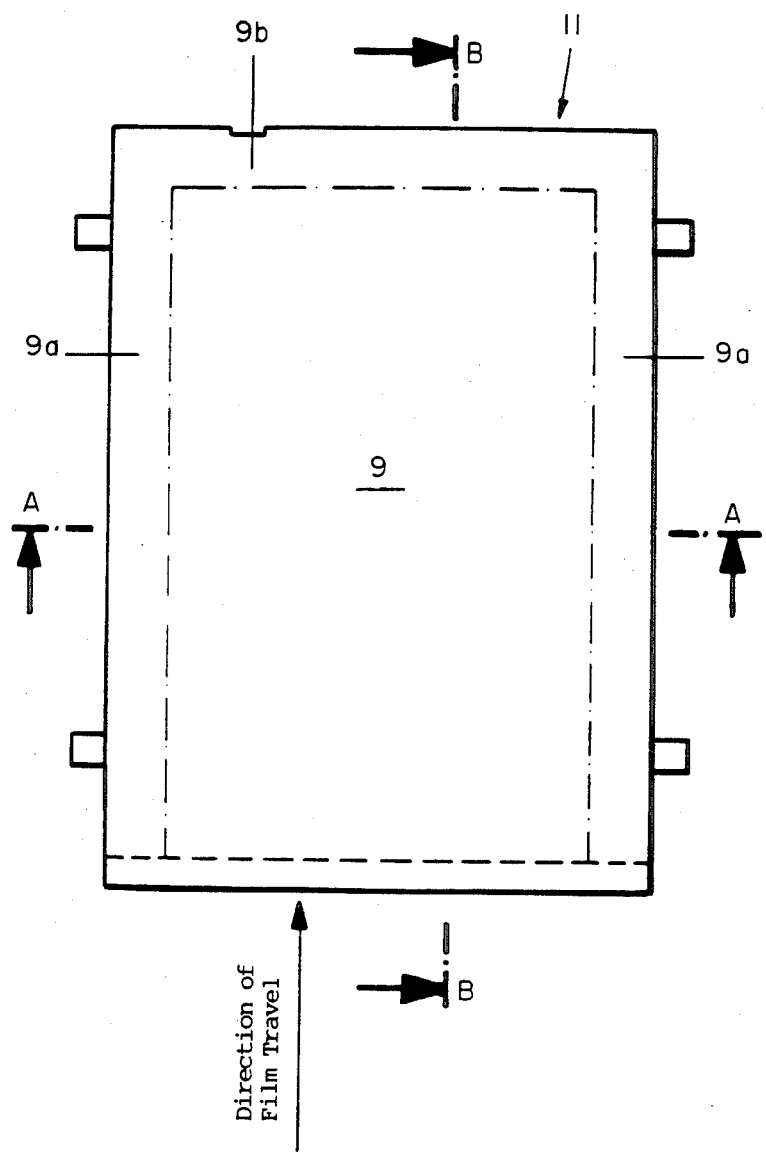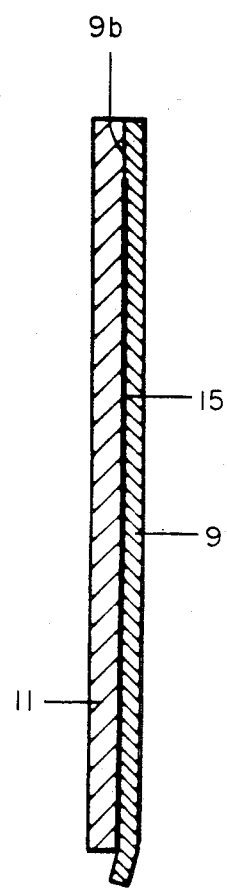

X-RAY FILM CASSETTE FOR DAYLIGHT SYSTEM

BACKGROUND OF THE INVENTION

The invention relates to an X-ray cassette for daylight X-ray systems, composed of:
a flat housing, impervious to light, containing on one side a light-tight, closeable, slit-shaped opening for the insertion of film,
two intensifying screens that have been inserted into the housing substantially parallel to each other, one of which is affixed to an elastic pad and the other to a firm pressure plate that is moveable in a direction substantially perpendicular to the plane of the intensifying screens,
an externally operated apparatus to simultaneously open the light-tight closure of the film insertion opening and lift the pressure plate and its intensifying screen from the opposite intensifying screen or from the sheet of film located between the two intensifying screens.

Such X-ray film cassettes are known from German PS No. 21 66 251, German OS No. 24 38 278 and U.S. Pat. No. 3,870,889. These are used in daylight systems, which make it possible to automatically load and unload X-ray cassettes with film without a darkroom. In this method, the empty cassette with the film insertion slot up is inserted into a film dispenser, which has a device to open the film insertion opening and simultaneously lift the pressure plate and its screen from the opposite intensifying screen so that the sheet of film can fall from the dispenser into the cassette where it comes to rest between the two intensifying screens. When the cassette is removed from the dispenser, the film insertion opening is closed to light and the pressure plate presses the two intensifying screens into good contact with both sides of the X-ray film. After exposure, the cassette is inserted into an unloading apparatus—for example, a developing machine—wherein the film insertion opening is opened again and the pressure plate lifted, so that the film falls of its own weight either directly into a developing machine or into a collector from where it can be transported, as desired, into a developing machine. This type of apparatus is described in U.S. Pat. No. 3,715,087.

During the unloadng procedure, the film can, despite the release of the pressure plate, stick to one or both intensifying screens and either not drop or be delayed. Delays of more than three seconds hinder rapid and continuous work flow. Various measures have already been proposed for faster and more reliable unloading of the cassette.

According to German OS. No. 24 38 278, either a part of the intensifying screen or a special metal part is so linked to the cassette wall that the free ends swing away from the wall to a perpendicular position and thus release the film. The construction requires that the cassette be placed in a specific position for loading as well as unloading. A change in the orientation of the cassette would hinder loading; in unloading, the apparatus would be useless.

European Patent Application EP No. 00 75 876 describes a cassette furnished with a "buckler", which is automatically activated in the unloading process and momentarily pushes against the film edges, buckling the film and thus releasing it from the screens. Although the relatively expensive construction accelerates unloading, the desired short fall time of three seconds is not always attained, especially when intensifying screens with smooth surfaces and large film sizes are used.

In WO No. 84/01040, a lever serves the same purpose. It is installed in a corner of the cassette on the side opposite the opening of the cassette and on being activated, pushes the film in an essentially diagonal direction with respect to the cassette wall, as a result of which the film is buckled and released from the intensifying screens. However, the activation of the lever is not automatic, but requires an extra handle.

For another type of cassette, namely, the so-called book cassette, in which the housing and the cover are connected by a hinge, procedures are described to facilitate the release of the film from the intensifying screen. In X-ray cassettes in accordance with U.S. Pat. No. 3,511,990, both intensifying screens are placed on layers of elastic material, the edges of which bear thicker elastic strips; when the cassette cover is opened, the expansion of the elastic edge strips lifts the film from the intensifying screens. This arrangement cannot be used in the daylight cassettes of the subject invention in which one intensifying screen must be attached directly to the pressure plate without an elastic underpad.

In addition to the above described individual disadvantages, all of these prior art developments have the common disadvantage of requiring additional mechanical devices that complicate cassette production without the required short film drop times being attained.

Therefore the object of the subject invention is to produce an X-ray film cassette of the above named type such that very short film drop times are attained at unloading without additional mechanical devices. An additional object of the invention is to improve the known cassettes furnished with mechanical devices so that film drop times of less than three seconds are attained.

SUMMARY OF THE INVENTION

These objectives are fulfilled in a surprisingly simple manner such that the intensifying screen affixed to the pressure plate has edge zones that are not attached to the pressure plate surface on the two long dimensions and optionally, on the short dimension opposite the film insertion opening.

This is achieved by having the edge zones free of adhesive. The width of these zones is 0.03 to 0.2 times the short dimension of the intensifying screen and in the conventional cassette sizes is preferably between 10 and 60 mm. In one particular embodiment, the edge zones are bent slightly toward the plane of the film. In this case, an edge zone width of only 2–5 mm is adequate. The fourth side of the intensifying screen at the film insertion opening is advantageously bent, by known methods, away from the plane of the film to assure problem-free insertion of the film into the cassette.

BRIEF DESCRIPTION OF THE DRAWINGS

The invention is described in greater detail in the following diagrams and examples.

FIG. 2 shows the pressure plate/intensifying screen combination in one embodiment of the invention having adhesive-free edge zones.

FIGS. 2A and 2B are cross-sectional views taken along the section lines A—A and B—B respectively of FIG. 2.

DETAILED DESCRIPTION OF THE PREFERRED EMBODIMENTS

Figure 1:
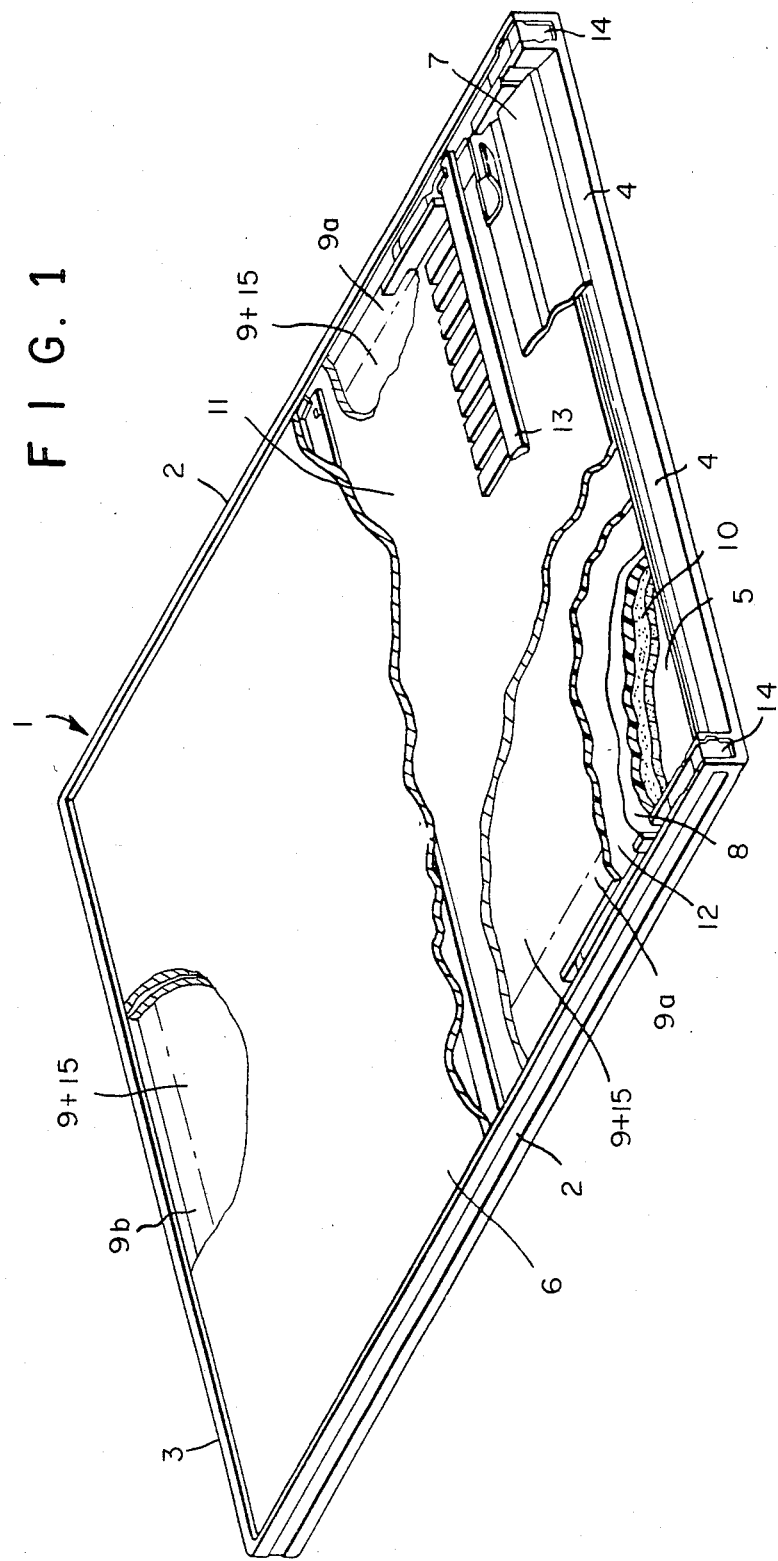
FIG. 1 shows a pictorial representation of a typical X-ray film cassette basic to the invention.

FIG. 1 shows only the important elements of an X-ray daylight cassette; the prior art shows additional details, as, for example, in EP No. 00 75 876. The cassette consists of a housing 1 comprising a frame with long dimensions 2 and short dimensions 3 and 4 as well as front and back cover plates 5 and 6. A film insertion slot or opening is located on the short dimension 4 and is covered in a light-tight fashion by the closure 7 when the cassette is closed. Two intensifying screens 8 and 9 are situated inside the cassette housing, shown in 2-6, one of which, 8 is affixed on a resilient or elastic pad 10 and the other 9 on a moveable firm pressure plate 11. The film 12 is positioned between the two intensifying screens. The pressure plate 11 exerts pressure through springs 13 toward the opposite intensifying screen to assure good contact between film and intensifying screens. Opening the closure 7 of the film insertion slot, lifting the pressure plate 11 and releasing the pressure of the springs 13 in loading and unloading the cassette is accomplished by a release device, not shown in detail, since it does not form part of this invention, which is inserted into the channels 14 in the long dimension 2 and activated by external loading and unloading apparatuses.

The intensifying screen 9 is affixed to the pressure plate 11 by an adhesive layer 15 in such a way that the edge zones 9a on the long sides of the rectangular cassette and edge zone 9b opposite the side opening on the short dimension 4 are adhesive-free.

FIG. 2 shows the pressure plate 11 with the intensifying screen 9 adhering to the entire surface except the edge zones 9a and 9b. The adhesive layer is identified by 15. The intensifying screen is not bent. Typically, the width of the edge zones is about 0.03 to 0.2 times the short side dimension 4 and for typical cassettes lies in the range of 10–60 cm. The particular ratios used are not critical as will be seen from the Examples.

Figure 3:
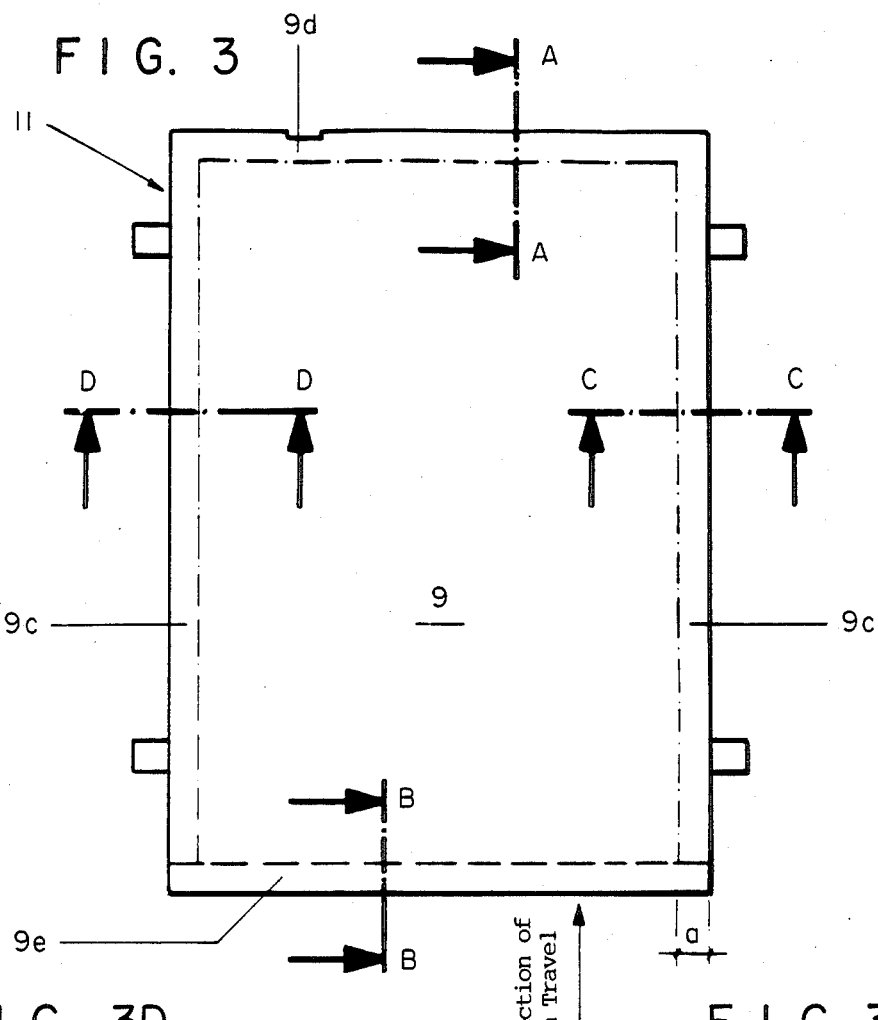
FIG. 3 shows an alternative embodiment of the invention in which the pressure plate/intensifying screen combination has canted edge zones.
Figure 3D:
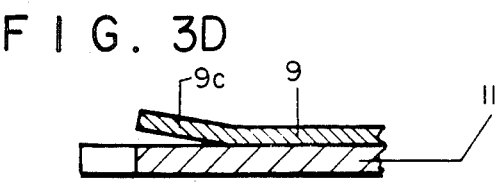
FIGS. 3A, 3B, 3C, and 3D are fragmentary cross-sectional views taken along the section lines A—A, B—B, C—C, and D—D, respectively of FIG. 3.
Figure 3C:
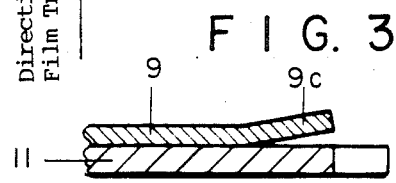
Figure 3A:
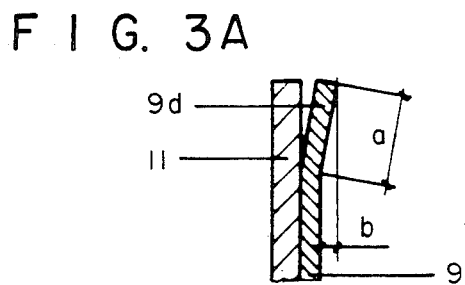
Figure 3B:
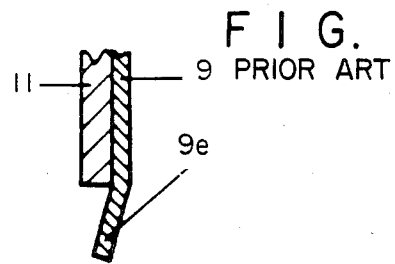

FIG. 3 shows an alternative embodiment wherein the intensifying screen 9 is adhered to the pressure plate 11 up to the small edge zones 9c and 9d. These edge zones are bent away from the pressure plate 11 toward the plane of the film as illustrated in FIGS. 3A, 3B and 3C. The ratio of the width (a) of the bent edge zones to the height (b) of the bend is about 10:1. FIG. 3B shows the prior art bend in edge zone 9e that serves to facilitate film insertion. Edge zone 9e is not supported by the pressure plate and bends in the opposite direction. The width of the bent edge zone may be about 2-5 mm wide for a typical cassette.

The effect of the invention on film drop times in unloading cassettes is illustrated in the following examples.

Example 1

Five X-ray daylight cassettes of the type previously described are used for film sizes of 24×30 cm, 30×40 cm, 35×35 cm, and 35×43 cm (2 cassettes). These are furnished with "bucklers", except for the 24×30 cm cassette and one 35×43 cm cassette. The cassettes contain pressure plates on the entire surfaces of which intensifying screens have been adhered by conventional methods. The cassettes are loaded with X-ray film of corresponding sizes and then installed in an unloading apparatus for daylight film. The time for the film to drop is measured. Ten measurements are made for each cassette and the mean values of the film drop times calculated. ("Comparison").

Then the same cassettes are furnished with pressure plates on which intensifying screens have been adhered with edge zones 18 mm wide that do not adhere on three sides. The film drop tests are repeated as above ("Variation A"). In a similar manner, the cassettes are then furnished with pressure plates on which the intensifying screens are bent upward as seen in FIGS. 3A 3C, and 3D about 0.3 mm over a width of 3 mm. The film drop times are determined as before ("Variation B"). The results of the three test series are presented in Table 1.

TABLE 1

| Cassettes/ | Mean Film Drop Times (sec) | | |
|---|---|---|---|
| Film Sizes (cm) | Comparison | Variation A | Variation B |
| 24 × 30* | 4,9 | 1,1 | 1,1 |
| 30 × 40 | 6,4 | 1,3 | 2,0 |
| 35 × 35 | 6,8 | 1,9 | 2,2 |
| 35 × 43 | 9,0 | 1,5 | 2,9 |
| 35 × 43* | 14,6 | 3,6 | 5,4 |

*without "buckler"

These data show the substantial reduction in film drop time with the use of the invention, which is applicable also if the cassettes are furnished with a mechanical device for better film separation.

EXAMPLE 2

A 35×43 cm cassette is furnished successively with pressure plates bearing intensifying screens with various widths of adhesive-free edge zones. The drop times are measured as in Example 1. The results are listed in Table 2.

TABLE 2

| | Edge Zone Width (mm) | | | | | |
|---|---|---|---|---|---|---|
| | 0 | 15 | 18 | 25 | 35 | 55 |
| Film Drop Times (sec) | 9,0 | 2,5 | 1,5 | 1,7 | 1,8 | 2,6 |

All tests were conducted with the Du Pont Daylight System with daylight cassettes, "Quanta" III intensifying screens, the CDPL Unloader and "Cronex" 4 X-ray film.

We claim:

1. An X-ray film cassette for daylight systems, comprising:
 a flat, light-impermeable housing, which has on one face a light-tight, closeable, slit-shaped film insertion opening,
 two intensifying screens fitted inside the housing substantially parallel to each other, one of which is affixed on an elastic pad and the other directly on a firm, film pressure plate that is movable substantially perpendicularly to the plane of the intensifying screens, and adapted to receive a film sheet therebetween, characterized in that the intensifying screen affixed to the pressure plate has edge zones that are not bonded to the pressure plate.

2. An X-ray film cassette, in accordance with claim 1, characterized in that the intensifying screens are rectangular having a long dimension and short dimension and that the edge zones of the intensifying screen that are not bonded to the pressure plate are 0.03 to 0.2 times as wide as the short dimension.

3. An X-ray film cassette, in accordance with claim 2, characterized in that the width of the edge zones that are not bonded to the pressure plate is 10-60 mm.

4. An X-ray film cassette, in accordance with claim 1, characterized in that the edge zones of the intensifying screen that are not bonded to the pressure plate are 2-5 cm wide and bent towards the plane of the film.

5. An X-ray film cassette, in accordance with claim 4, characterized in that the height of the bend is about one tenth the width of the edge zone.

* * * * *